United States Patent [19]

Hegedus

[11] 4,199,477

[45] Apr. 22, 1980

[54] METHOD FOR APPLICATION OF POROUS WASH COATS TO LOW POROSITY REFRACTORY CATALYTIC MONOLITHS AND THE RESULTING SUPPORT

[75] Inventor: Louis Hegedus, St. Clair Shores, Mich.

[73] Assignee: General Motors Corporation, Detroit, Mich.

[21] Appl. No.: 562,658

[22] Filed: Mar. 27, 1975

[51] Int. Cl.² .......................... B01J 29/00; B01J 23/08
[52] U.S. Cl. .................................... 252/450; 252/463; 252/477 R
[58] Field of Search .................. 252/450, 477 R, 463; 156/28, 18

[56] References Cited

U.S. PATENT DOCUMENTS

| 2,903,434 | 9/1959 | Gloss et al. ....................... 252/450 X |
| 2,967,185 | 1/1961 | Becker et al. ..................... 252/450 X |
| 3,416,975 | 12/1968 | Pollack et al. ..................... 156/22 X |
| 3,839,224 | 10/1974 | Yonehara et al. ................ 252/477 R |
| 3,856,706 | 12/1974 | Harrison et al. ...................... 252/450 |

*Primary Examiner*—Carl F. Dees
*Attorney, Agent, or Firm*—Sidney Carter

[57] ABSTRACT

The method for obtaining a tightly adherent, uniformly dispersed porous wash coat by the use of dilute aqueous hydrofluoric acid, 1–5% HF, as an etchant for refractory low porosity catalytic monolith supports to produce substantial improvement of the adhesion, dispersion and uptake characteristics of such supports for porous wash coats. The application of an ultrasonic energy field to the etchant bath greatly accelerates the etching process.

8 Claims, 8 Drawing Figures

BEFORE

AFTER

BEFORE

AFTER

BEFORE

AFTER

BEFORE

AFTER

METHOD FOR APPLICATION OF POROUS WASH COATS TO LOW POROSITY REFRACTORY CATALYTIC MONOLITHS AND THE RESULTING SUPPORT

Catalytic monoliths for automotive exhaust control applications are normally manufactured of refractory, relatively non-porous ceramic materials, such as cordierite, mullite, fused silica, $\alpha$ alumina and the like. In order to support catalytically active components, e.g., noble metals such as platinum or palladium and other metals or their oxides such as nickel, chromium, copper and other transition metals of the Periodic Table of Elements, in a well dispersed manner, the ceramic based monoliths are coated with a thin layer of porous catalyst support, such as alumina.

The dispersion of the porous wash coat layer over the ceramic surface and its adhesion to the ceramic surface are important parameters which affect the performance and life of catalytic monoliths in industrial practice. In general, the aim is to prepare monoliths with a uniform, strongly bound wash coat layer on the ceramic surface. Different methods have been developed to achieve such coatings, a typical process being that disclosed in U.S. Pat. No. 3,554,929 issued to R. Aarons, Jan. 12, 1971.

Ceramic monoliths of high porosity can be manufactured and are commercially available. However, frequently they do not have a high degree of strength when exposed to stresses which can occur during the operation of a catalytic converter used to oxidize hydrocarbons and carbon monoxide or reduce nitrogen oxides in automotive exhausts.

Monoliths with low internal porosity are also available. While they have a much stronger wall structure which is better able to withstand the rigors of the automotive application, the distribution of a porous alumina wash coat layer is often highly non-uniform over the ceramic surface and the adhesion of the alumina layer is not always strong. In addition, in one impregnation the low-porosity monoliths take up less wash coat than more porous monolith materials.

The U.S. Pat. No. to Cornelius et al, 3,786,001, issued Jan. 15, 1974 discloses the use of acetic acid as a leaching solution for an active or porous alumina pellet, no porous wash coat being applied. U.S. Pat. No. 3,676,366 to Podschus et al, issued July 11, 1972 discloses the use of hydrochloric, nitric, or sulfuric acid to remove major portions of materials such as calcia, alumina and magnesia from a silica base catalyst support bead, no porous wash coat being applied.

This invention has as its object the treatment of ceramic monoliths which have a low internal porosity and a smooth surface to enable successful porous wash coat application. It is desired that such a monolith retain at least a part of the strong wall structure while the surface of the ceramic material is sufficiently roughened to better distribute and bind the porous wash coat layer. A further object is to achieve such desirable characteristics by a readily controlled process so as to prevent undue weakening of the walls of the monolith channels and to minimize the length of time required by the process. More particularly, I have found that a dilute hydrofluoric acid etching treatment produces the desired results and that the treatment process is greatly accelerated by using an ultrasonic etching bath.

The objects of my invention were achieved through a process involving the steps of immersing the monolith support member in an aqueous, hydrofluoric acid solution containing 1–5% by weight acid at a temperature of ambient to about 100° C., the solution being slowly stirred. Such treatment for a period of up to about two hours at room temperature being followed by thorough rinsing to remove traces of acid and water soluble salts. Coating with an active alumina precursor slurry, i.e., boehmite or pseudoboehmite, is followed by firing in air at about 650° C. for up to about three hours. This results in a uniform, tightly adherent porous alumina coating of suitable thickness with a minimum number of coating dips. Also, the strength of the monolith is retained at a desired level.

As pictured in the photographs, FIG. 1 shows scanning electron micrographs of a cordierite monolith surface at 3,000 times magnification and 30° tilt, both before and after treatment.

In carrying out my experiments using cordierite monolith support members, the members were etched in various concentrations of hydrofluoric acid in water, at various temperatures, for various time intervals. Typically, a 2 weight percent solution of HF at room temperature provided a greatly enhanced surface roughness in about 2 hours etching time. Generally, the treating process may be accelerated by either increasing the temperature or acid concentration. I have found that acid concentration may vary from 1–5% by weight with temperatures as high as about 100° C. while time of treatment may vary from about ¼ to about 3 hours. Excessive etching treatment will result in a weakening of the monolith strength and I have found that the loss in weight in etching should be limited to about 3% of the original monolith weight, dry. Results reported in Table I refer to these etching conditions.

In performing my treatment, the monolith supports were fired in air at 650° C. for 3 hours, cooled, and immersed in the slowly stirred dilute HF solution. After etching, the monoliths were rinsed with distilled water and washed 3 times in boiling distilled water to remove any traces of hydrofluoric acid and its water soluble salts. After washing, the monoliths were dried at 110° C. and fired in air at 650° C. for 3 hours. A krypton adsorption BET technique was used to determine the surface areas before and after etching. To determine their water uptake, the monoliths were heated to 650° C., cooled, weighed, immersed in water, and the excess water was removed by blowing air through the channels under reproducible conditions. The weight difference determined the water uptake. The firing at 650° C. was performed in order to establish a constant reference point against which to measure weight changes after treatment and after coating.

Crush tests were carried out using 1 inch cube shaped monolith blocks. They were crushed in the axial direction and in a direction perpendicular to the longitudinal axis of the channels, along the surface normal to the square channels. The force which resulted in the physical destruction of the monolith cubes was measured.

Table I

|  | Commercial High-porosity Monolith | Low-Porosity Monolith Unetched | Low-Porosity Monolith Etched |
|---|---|---|---|
| Channel shape | square | square | square |
| Wall thickness (in) | 0.010 | 0.012 | 0.012 |
| Composition | cordierite | cordierite | cordierite |
| Channel Dimension (cm) (length of one side) | 0.15 | 0.14 | 0.14 |
| Porosity (%) | ~38 | ~15 | |
| Crush resistance, perpendicular (psi) | ~200 | ~3000 | ~1000 |
| Crush resistance, axial (psi) | ~1500 | ~6000 | ~2000 |
| Water uptake (g/g calcined monolith) | | 0.01 | 0.19 |
| Coating uptake on first impregnation (calcined) (weight %) | | 2.96 | 5.42 |
| Surface area (m$^2$/g) | | 0.12 | 0.54 |

Figure 1A:
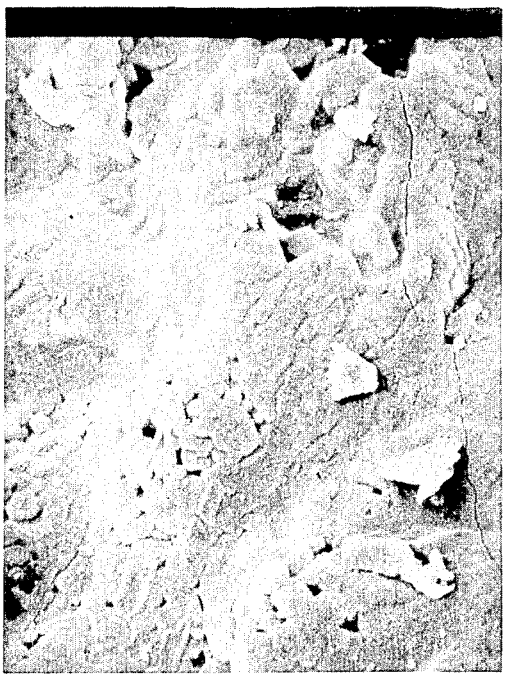
Figure 1B:
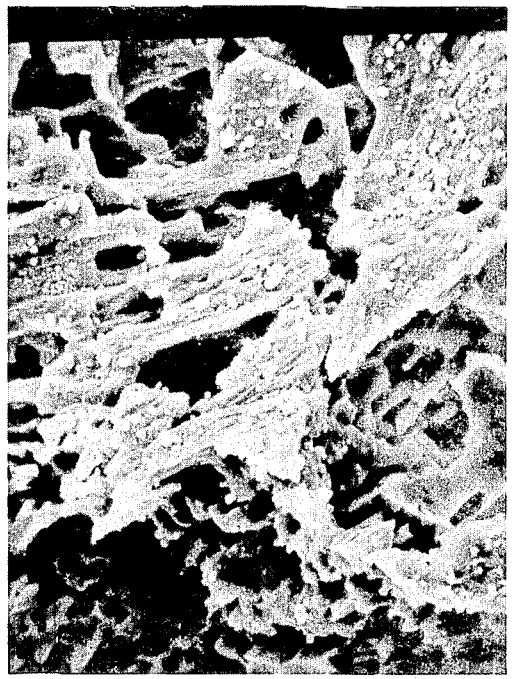

The effect of my treatment is clearly shown in the drawings. FIG. 1 shows scanning electron microscopic pictures of an unetched and etched low-porosity cordierite monolith. Etching increased the surface roughness quite visibly; the surface area increased from 0.12 m$^2$/g to 0.54 m$^2$/g, a 4.5-fold increase. The water uptake of the unetched monolith was 0.10 g water/g calcined monolith. Upon etching, this number increased to 0.19 g water/g calcined monolith.

Figure 2A:
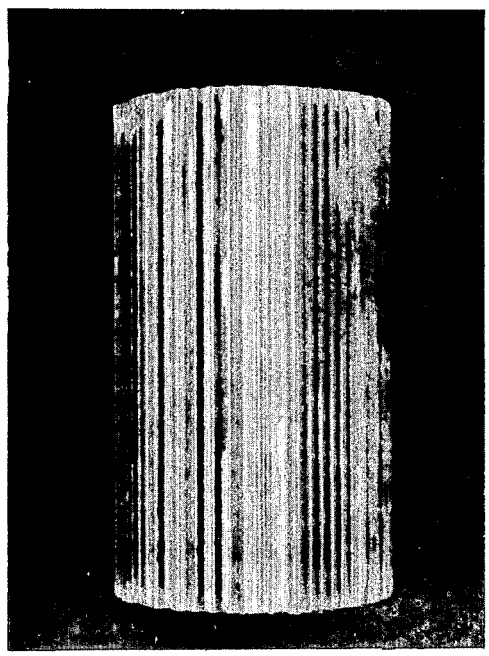
FIG. 2 shows the porous alumina coated cordierite monolith support member both before and after treatment and without magnification.
Figure 2B:
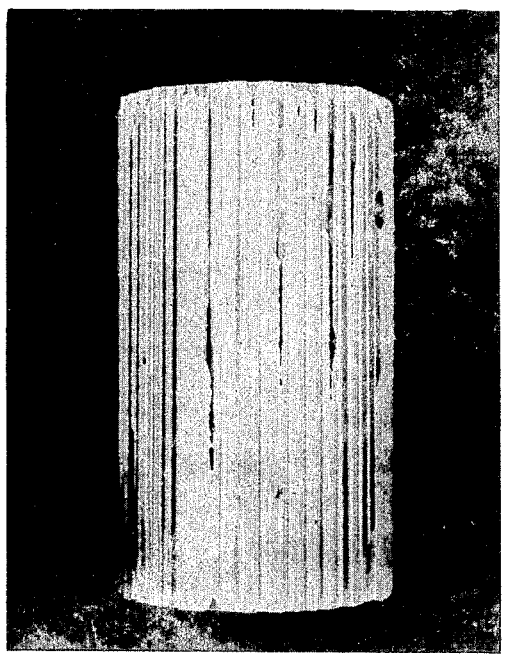

The etched and unetched monoliths were coated with porous ceramic material, i.e., alumina, dispersed in an aqueous medium. After immersing the monoliths into the wash coat suspension, the supports were drained, air dried, and fired for about 2-3 hours, at a temperature of about 550°-700° C. preferably at 650° C. FIG. 2 compares the distribution of the porous wash coat layer over the etched and unetched monoliths. The photographs were taken at the same light conditions and exposures. The non-uniformities of the unetched monolith are quite visible. The coating appears as white patches. In contrast, the etched monolith has a uniform white appearance.

In a single impregnation, the unetched monolith held 2.96 weight % alumina (calcined). The etching by HF increased this to 5.42 weight %, an increase of 83%.

Figure 3A:
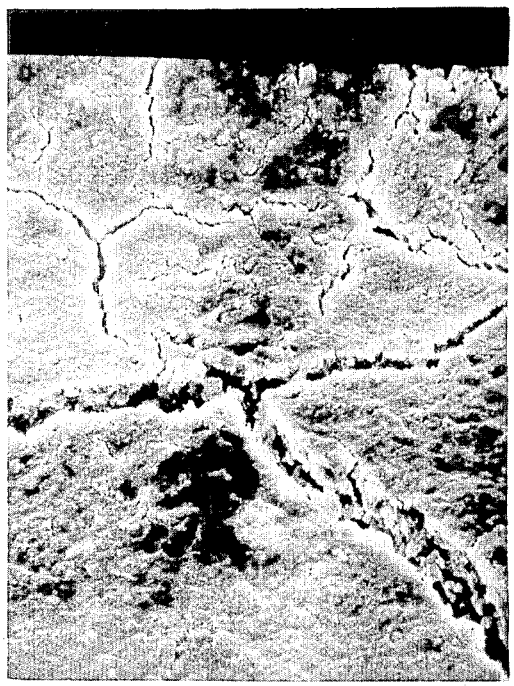
FIG. 3 shows scanning electron micrographs of the alumina coated cordierite surface both before and after treatment and at 1000 times magnification and 30° tilt.
Figure 3B:
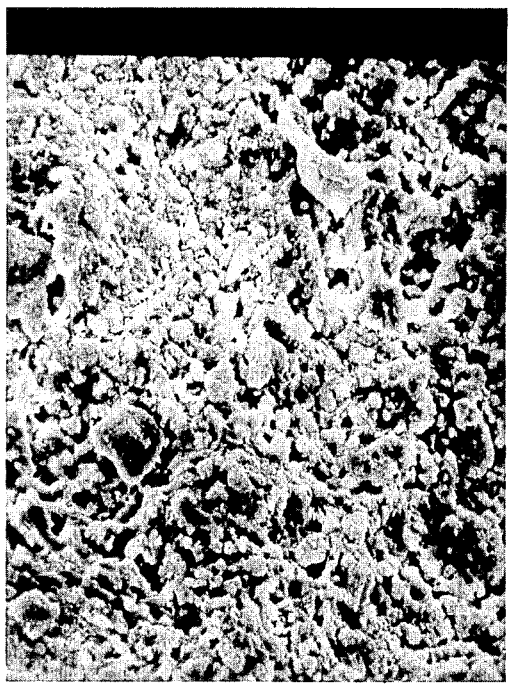
Figure 4A:
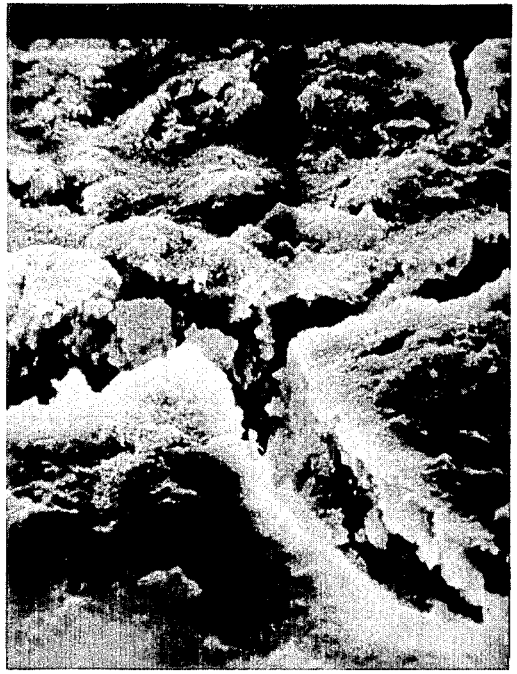
FIG. 4 shows the scanning electron micrographs of the alumina coated cordierite surface both before and after treatment and at 3000 times magnification and 30° tilt.
Figure 4B:
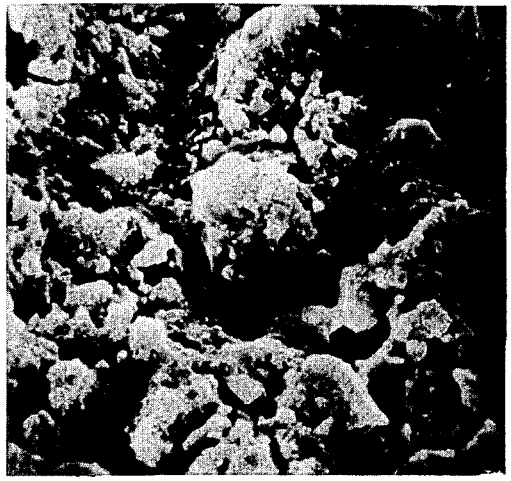

FIGS. 3 and 4 show scanning electron micrographs of the same monoliths at 1000 times and 3000 times magnification. The coating developed deep cracks at 650° C. over the surface of the unetched monolith while the etched monolith surface retained the coating in a well dispersed fashion, strongly bonded by the rough surface.

Results of the crush tests, along with other properties of three monoliths, are displayed in Table I, which also contains data for a highly porous but mechanically weak monolith. This table illustrates the advantages of the etching procedure. The coated monolith support is adapted to be impregnated with one or more catalytic constituents of the type described above in the manner well known in the art and such impregnation forms no part of my invention.

I have also found that the treatment process of my invention may be greatly accelerated if it is carried out in an ultrasonic bath. A frequency of about 56 KHz was used, this not being critical since it is only necessary to create an agitating effect. By way of example, a three-minute acid treatment time will suffice if an ultrasonic field is applied to the bath, whereas a period of two hours without ultrasonics is required, the bath being 2% by weight acid, and the temperature being ambient.

It can be seen from the foregoing description that I have developed a method for obtaining a porous wash coat on a low porosity refractory monolith which results in a catalytic monolith support on which the coating is strongly adhered and evenly dispersed, the coating thickness being achieved by a minimum number of dips. While I have described my invention in terms including a preferred embodiment, the scope of my invention is as covered by the claims which follow.

What is claimed is:

1. In a process for production of a high strength and low porosity cordierite catalytic monolith support having an active alumina coating tightly adherent to and evenly dispersed on the surfaces of the thin walls thereof, the steps of immersing the low porosity support in an aqueous hydrofluoric acid bath containing 1-5% by weight acid at a temperature from ambient to about 100° C., etching the surfaces of said support for a period of time sufficient to produce a roughened surface with the removal of not more than about 3% of the weight of the original support, washing said etched support to remove all traces of acid and its water soluble salts, drying said support, immersing said support in a slurry of active alumina or alumina precursor to be applied to its surfaces, draining and air drying said support, and firing said coating support for a period of up to 2-3 hours in air, the strength of said support being substantially retained and said coating being picked-up in sufficient quantity to minimize the need for repeated dip coating operations.

2. A process as set forth in claim 1 wherein the acid concentration is about 2% and treatment is accomplished at ambient temperature.

3. A process as set forth in claim 1 wherein the acid is subjected to an ultrasonic field during the period of support treatment.

4. A process as set forth in claim 2 wherein the acid is subjected to an ultrasonic field during the period of support treatment.

5. A catalytic support monolith suitable for use in control of automotive exhaust emissions prepared by the process of claim 1.

6. A catalytic support monolith suitable for use in control of automotive exhaust emissions prepared by the process of claim 2.

7. A catalytic support monolith suitable for use in control of automotive exhaust emissions prepared by the process of claim 3.

8. A catalytic support monolith suitable for use in control of automotive exhaust emissions prepared by the process of claim 4.

* * * * *